US008820725B2

(12) United States Patent
Kuo

(10) Patent No.: US 8,820,725 B2
(45) Date of Patent: Sep. 2, 2014

(54) ASSEMBLY DEVICE FOR ASSEMBLYING CAMERA MODULE

(71) Applicant: Hon Hai Precision Industry Co., Ltd., New Taipei (TW)

(72) Inventor: Chang-Wei Kuo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/864,257

(22) Filed: Apr. 17, 2013

(65) Prior Publication Data
US 2014/0157920 A1    Jun. 12, 2014

(30) Foreign Application Priority Data
Dec. 10, 2012   (TW) .............................. 101146476 A

(51) Int. Cl.
*B25B 11/00*    (2006.01)
(52) U.S. Cl.
USPC ................................... 269/8; 269/43; 269/95
(58) Field of Classification Search
CPC .............. B25B 1/00; B25B 1/04; B25B 3/00; B25B 11/002; B25B 11/007
USPC ............................ 269/8, 43, 45, 246, 249, 71
See application file for complete search history.

(56) References Cited

U.S. PATENT DOCUMENTS

| | | | | |
|---|---|---|---|---|
| 4,569,511 A * | 2/1986 | Bell, Jr. | ........................ | 269/276 |
| 4,971,301 A * | 11/1990 | Yang | ............................ | 269/153 |
| 5,971,379 A * | 10/1999 | Leon, Jr. | ........................... | 269/8 |
| 6,361,034 B1 * | 3/2002 | Wolfe | ............................... | 269/8 |
| 2002/0171191 A1 * | 11/2002 | Hudson | ......................... | 269/279 |
| 2004/0070132 A1 * | 4/2004 | Varzino et al. | ............... | 269/246 |
| 2010/0078864 A1 * | 4/2010 | Lancaster-Larocque | ......... | 269/8 |
| 2013/0239374 A1 * | 9/2013 | Takkinen | .................... | 24/69 CT |

* cited by examiner

*Primary Examiner* — Lee D Wilson
(74) *Attorney, Agent, or Firm* — Novak Druce Connolly Bove + Quigg LLP

(57) ABSTRACT

An assembly device includes a bottom base, two baffles, two screws, and two magnetic members. The bottom base includes a receiving portion configured to receive a camera module. The receiving portion includes two adjacent fixed members and two adjacent moveable members. The baffle is secured to a sidewall of the bottom base. The screw passes through one baffle and can push one moveable member. The magnetic member is arranged on one moveable member. When the screw is rotated toward a first direction, the one screw pushes the corresponding moveable member to move toward the opposite fixed member, when the one screw is rotated toward a second direction, the attraction between the one screw and the first magnetic member draws the corresponding moveable member away from the opposite fixed member.

8 Claims, 3 Drawing Sheets

ASSEMBLY DEVICE FOR ASSEMBLYING CAMERA MODULE

BACKGROUND

1. Technical Field

The present disclosure relates to assembly devices, and particularly to an assembly device for assembling different camera modules.

2. Description of Related Art

To assemble a camera module that may be used in an electronic device, a camera sub-assembly and a shield casing are placed in a receiving space of an assembly device and the two parts pressed together by the assembly device. Different model camera modules may have different sizes and require their own specially sized assembly devices, which increases assembly cost.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
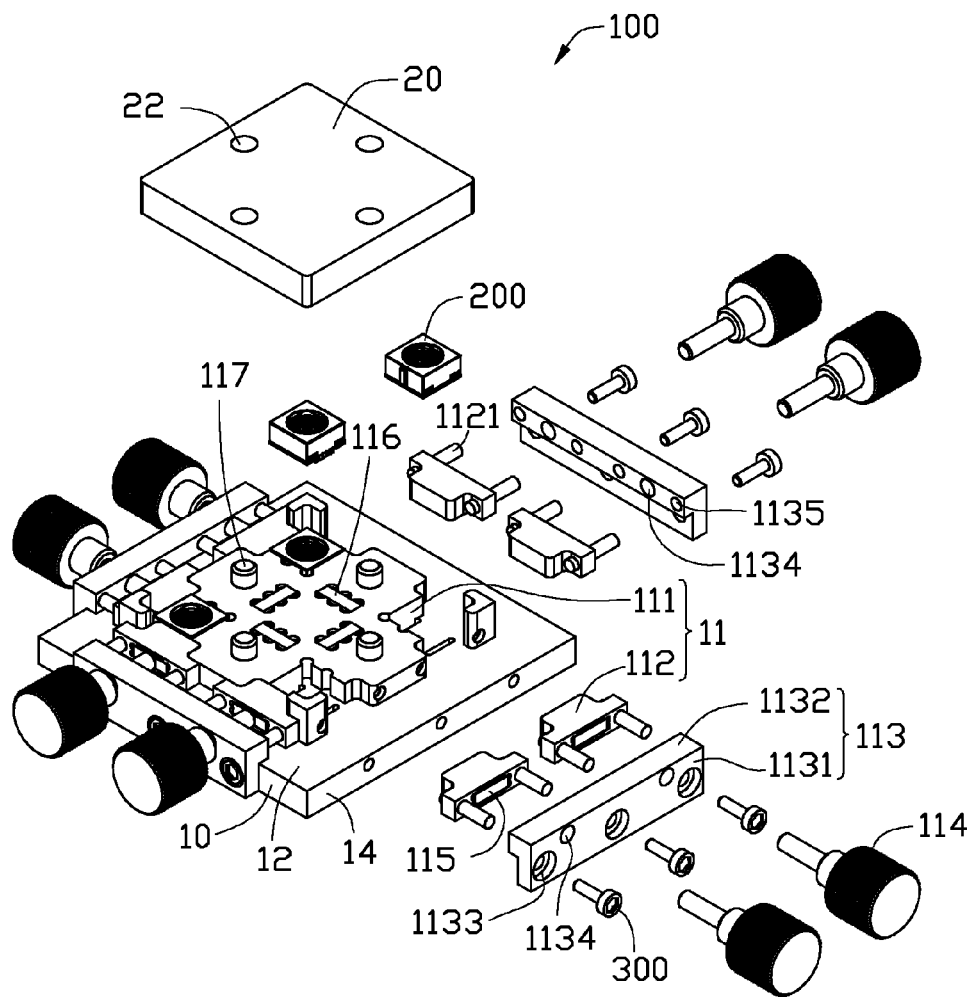
FIG. 1 is a partial, exploded, perspective view of an assembly device for camera modules, in accordance with an exemplary embodiment.

Referring to FIG. 1, an embodiment of an assembly device 100 is illustrated. The assembly device 100 includes a bottom base 10 and a top base 20. Four receiving portions 11 are formed on a top surface 12 of the bottom base 10, and each receiving portion 11 includes two adjacent fixed members 111 and two adjacent moveable members 112. The assembly device 100 further includes four baffles 113, eight screws 114, and eight magnetic members 115. The baffles 113 are respectively connected to four sidewalls 14 of the bottom base 10. Each screw 114 is used to push one moveable member 112. Each magnetic member 115 is arranged on one moveable member 112.

Each baffle 113 includes a connecting portion 1131 and a protruding portion perpendicular to the connecting portion 1131. The connecting portion 113 and the protruding portion 1132 are square-shaped. The connecting portion 1131 defines three fixing holes 1133 each corresponding to a fixing member 300 and two screw holes 1134 each corresponding to one screw 114. The protruding portion 1132 defines two pairs of guiding holes 1135. Each screw hole 1134 is arranged between one pair of guiding holes 1135. In this embodiment, the guiding holes 1135 are blind holes, but can be through holes in other embodiment. The fixing members 300 cooperate with the fixing holes 1133 to fix the connecting portion 1131 to the sidewall 14 of the bottom base 10. When the connecting portion 1131 is secured to the sidewall 14, the guiding holes 1135 face the receiving portion 11.

A pair of guiding posts 1121 protrude from each moveable member 112, and the corresponding magnetic member 115 is arranged between the guiding posts 1121. A distal end of each guiding post 1121 is received in one guiding hole 1135.

In this embodiment, when one screw 114 is rotated clockwise, the screw 114 pushes one moveable member 112 toward the opposite fixed member 111. When the screw 114 is rotated counterclockwise, the attraction between the screw 114 and the magnetic member 115 draws the moveable member 112 away from the opposite fixed member 111.

With such configuration, adjusting the moveable members 112 adjusts the size of the receiving portions 11e. Thus, the receiving portion 11 can receive different camera modules 200 having different sizes, and the assembly device 100 can be employed to assemble different camera modules 200, which decreases assembly cost.

Figure 2:
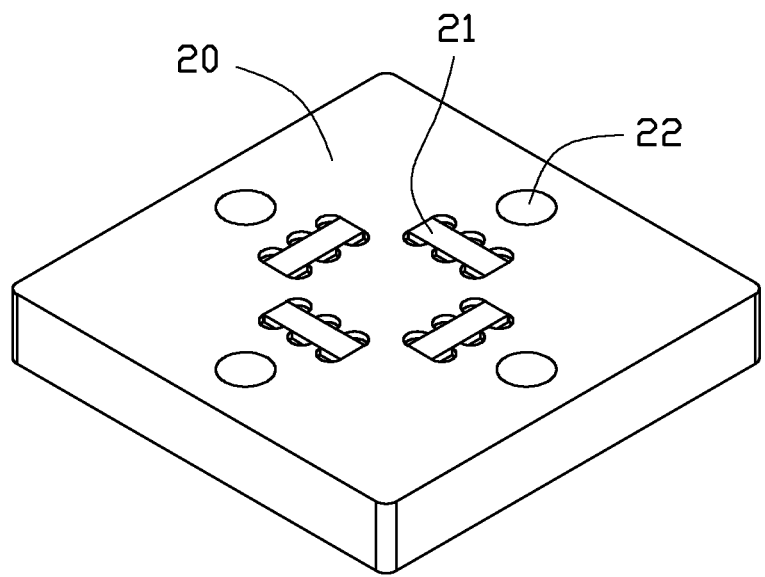
FIG. 2 is an isometric view of a top base of the assembly device of FIG. 1, viewed from another viewpoint.
Figure 3:
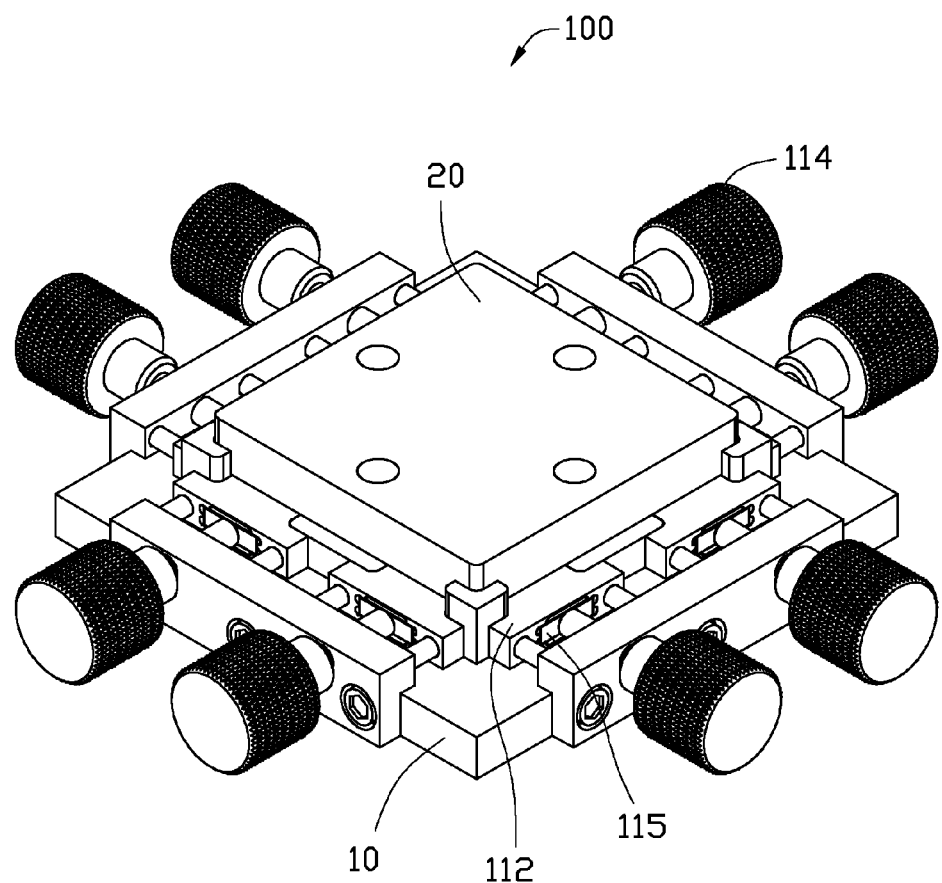
FIG. 3 is an isometric view of the assembly device of FIG. 1.

Referring to FIGS. 2-3, in this embodiment, the bottom base 10 further includes a number of magnetic members 116 and protruding posts 117 arranged among the fixed members 111. The top base 20 includes a number of magnetic members 21 and a number of through holes 22 each corresponding to one protruding post 117. When the top base 20 is placed on the bottom base 10, each protruding post 117 passes through one through hole 22, and the attraction among the magnetic members 116 and 21 causes the top base 10 to be tightly held to the bottom 20. At this point, other assembly steps may be performed on the camera module 100 while is held in the assembly device 200 such as a baking step.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An assembly device comprising:
   a bottom base comprising at least one receiving portion configured to receive a camera module, each receiving portion comprising two adjacent fixed members and two adjacent moveable members;
   at least two baffles each secured to a sidewall of the bottom base;
   at least two screws each passing through one baffle and configured to push one moveable member; and
   at least two first magnetic members each arranged on one moveable member and facing one screw;
   wherein, when one of the at least two screws is rotated toward a first direction, the one screw of the at least two screws pushes the corresponding moveable member to move toward the opposite fixed member, when the one of the at least two screws is rotated toward a second direction, the attraction between the one screw and the first magnetic member draws the corresponding moveable member away from the opposite fixed member.

2. The assembly device as described in claim 1, wherein each baffle defines at least one screw hole, each screw passes through one screw hole to contact one moveable member.

3. The assembly device as described in claim 2, wherein each baffle further defines at least one pair of guiding holes, each moveable member comprises a pair of guiding posts, a distal end of each guiding post is received in one guiding hole.

4. The assembly device as described in claim 3, wherein each first magnetic member is arranged between the guiding posts.

5. The assembly device as described in claim 1, wherein the screw hole of each baffle is arranged between one pair of guiding holes of each baffle.

6. The assembly device as described in claim 4, further comprising a top base, wherein the bottom base further comprises a plurality of second magnetic members adjacent to the at least one receiving portion, the top base further comprises a plurality of third magnetic members, the attraction among the plurality of second and third magnetic members causes the top base to be tightly held to the bottom base.

7. The assembly device as described in claim 6, wherein the bottom base further comprises a plurality of protruding posts adjacent to the at least one receiving portion, the bottom base defines a plurality of through holes each corresponding to one of the plurality of protruding posts.

8. The assembly device as described in claim 1, further comprising four receiving portions.

* * * * *